(12) United States Patent
Kim

(10) Patent No.: US 10,689,174 B2
(45) Date of Patent: *Jun. 23, 2020

(54) METHOD FOR PRODUCING PACKING SHEET WITH IMPROVED INSULATION AND STORAGE PROPERTIES

(71) Applicant: Ho Chil Kim, Iksan-si (KR)

(72) Inventor: Ho Chil Kim, Iksan-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/332,727

(22) PCT Filed: Aug. 30, 2017

(86) PCT No.: PCT/KR2017/009470
§ 371 (c)(1),
(2) Date: Mar. 12, 2019

(87) PCT Pub. No.: WO2018/052206
PCT Pub. Date: Mar. 22, 2018

(65) Prior Publication Data
US 2019/0359402 A1 Nov. 28, 2019

(30) Foreign Application Priority Data
Sep. 13, 2016 (KR) .................. 10-2016-0117724

(51) Int. Cl.
| | |
|---|---|
| B65D 65/40 | (2006.01) |
| B32B 37/00 | (2006.01) |
| B32B 7/12 | (2006.01) |
| B32B 27/08 | (2006.01) |
| B32B 3/28 | (2006.01) |
| B32B 38/00 | (2006.01) |
| B65D 81/38 | (2006.01) |
| B29C 65/00 | (2006.01) |

(52) U.S. Cl.
CPC ............ *B65D 65/40* (2013.01); *B29C 66/438* (2013.01); *B32B 3/28* (2013.01); *B32B 7/12* (2013.01); *B32B 27/08* (2013.01); *B32B 37/0053* (2013.01); *B32B 38/0004* (2013.01); *B65D 81/38* (2013.01); *B32B 2250/02* (2013.01); *B32B 2250/24* (2013.01); *B32B 2307/304* (2013.01); *B32B 2553/026* (2013.01)

(58) Field of Classification Search
None
See application file for complete search history.

(56) References Cited

FOREIGN PATENT DOCUMENTS

| | | |
|---|---|---|
| JP | 2004-249605 A | 9/2004 |
| JP | 2012-179875 A | 9/2012 |
| KR | 10-0995179 B1 | 11/2010 |
| KR | 10-2011-0004091 A | 1/2011 |
| KR | 10-1351072 B1 | 1/2014 |
| KR | 10-1389253 B1 | 4/2014 |
| KR | 10-1482311 B1 | 1/2015 |
| KR | 10-1500879 B1 | 3/2015 |
| KR | 10-1752100 B1 | 6/2017 |
| KR | 10-1752101 B1 | 6/2017 |
| KR | 10-1772821 B1 | 8/2017 |

*Primary Examiner* — Barbara J Musser
(74) *Attorney, Agent, or Firm* — Novick, Kim & Lee, PLLC; Jae Youn Kim

(57) ABSTRACT

Provided is a method for producing a packing sheet with improved insulation and storage properties, which can greatly reduce logistics costs by minimizing a volume during storage and transportation and also greatly increase insulation.

10 Claims, 16 Drawing Sheets

METHOD FOR PRODUCING PACKING SHEET WITH IMPROVED INSULATION AND STORAGE PROPERTIES

TECHNICAL FIELD

The present invention relates generally to a packing sheet and, more particularly, to a method for producing a packing sheet with greatly improved insulation and storage properties.

BACKGROUND ART

In general, packing materials are used not only to enhance the appearance of packed goods, but also to protect the packed goods against external impacts. In particular, in packing of electrical and electronic products or automobile parts such as, bumpers, fenders, doors, and the like, a first foaming paper sheet or an air cap wrapping sheet is generally used to separate the electrical and electronic parts and the automobile parts from an inner surface of a box wall inside of a paper box such that an impact force which may be externally applied to packed goods is absorbed and alleviated.

In the case of the air cap wrapping sheet, there is a problem in that the volume of air caps is inevitably large due to the air caps sealed in units of cells, causing an excessive increase in logistics costs such as transportation costs.

Meanwhile, in an effort to solve such a problem of the air cap wrapping sheet in the related art, Patent Documents 1 to 3 and the like have been proposed.

Patent Document 1 (Korean Patent No. 10-1482311) relates to a packing bag with a cushioning function, which includes a first cushioning air column part composed of multiple air columns, a second cushioning air column part composed of multiple air columns and connected to the first cushioning air column part to form an accommodation space for accommodating goods, and a tie connected to the first cushioning air column part and/or connected to the second cushioning air column part to close an entrance of the accommodation space.

Furthermore, Patent Document 2 (Korean Patent No. 10-1351072) relates to a package equipped with a double air bag and a packaging method thereof, the package including an inner cushioning part composed of a pair of backing sheets coupled to each other, the inner cushioning part in which air is filled and forming an accommodating portion for accommodating a packaging object; an outer cushioning part surrounding the inner cushioning part and in which air is filled; and an air injection part to which air is injected through an air inlet, wherein the air injection part is configured to communicate with the inner and outer cushioning parts via both an air filling inlet of the inner cushioning part and an air filling inlet of the outer cushioning part, whereby air filling of the inner and outer cushioning parts is completed by only one air injection through the air injection part.

Patent Document 3 (Korean Patent No. 10-0995179) relates to a bendable multi-sectional cushioning cover bag including a packaging box, a first air tube, a second air tube, and a light-reflecting sheet. Herein, an end of the second air tube is connected to the first air tube and communicates therewith. Furthermore, multiple first cushioning parts provided at the first air tube and multiple second cushioning parts provided at the second air tube correspond to each other, and each of the second cushioning parts and each of the first cushioning parts corresponding thereto are adhered together by means of heat sealing at respective three sides thereof, thus forming an accommodation space in which goods are mounted.

The packing bag, the package, and the cover bag disclosed in Patent Documents 1 to 3 can be transported and stored and in a state of not injecting air and thus are significantly reduced in volume as compared with the air cap packing sheet in the related art, resulting in a significant reduction in logistics costs such as transportation costs. In addition, air can be injected before use to realize a cushioning function, thus safely packing goods. Meanwhile, a predetermined insulation property is provided by air cells into which air is injected. However, the air cells are welded together, which may cause a problem in that heat exchange is increased by welded portions, resulting in a significant reduction in insulation.

DISCLOSURE

Technical Problem

Accordingly, the present invention has been made keeping in mind the above problems occurring in the related art, and an objective of the present invention is to provide a packing sheet capable of greatly reducing logistics costs by minimizing a volume during storage and transportation, while greatly increasing insulation.

Technical Solution

In order to accomplish the above objective, the present invention provides a method for producing a packing sheet with improved insulation and storage properties, the method including:

a) producing a formed film on which convex ridges are formed at a regular interval in a direction from a front side to a rear side thereof;

b) sealing the ridges by attaching a lower film to a lower side of the formed film, the lower film being configured such that a first end thereof is extended in a first side direction thereof longer than a first end of the formed film;

c) attaching an upper film onto the sealed ridges of the formed film, the upper film being configured such that a first end thereof is extended in a first side direction thereof longer than the first end of the formed film;

d) opening a portion of each of the sealed ridges of the formed film; and e) sealing second ends of the lower film, the formed film, and the lower film after a fluid in the sealed ridges of the formed film is removed.

Furthermore, a check valve may be provided on an upper surface of the first end of the lower film or on a lower surface of the first end of the upper film, and the check valve may comprise multiple check valves that are provided at a regular interval on the upper surface of the first end of the lower film or on the lower surface of the first end of the upper film.

The method may further comprise forming an injection space by sealing the first end of the lower film and the first end of the upper film, except for an injection hole of the check valve.

The formed film may be produced by melt-extruding a thermoplastic synthetic resin onto a vacuum forming roller having forming grooves that are formed in an outer circumferential surface thereof at a regular interval and have a shape corresponding to the ridges. Furthermore, the formed film may be produced by forming a thermoplastic synthetic resin film by using a thermoforming roller having forming protrusions that are formed at a regular interval and have a shape corresponding to the ridges.

The d) may include cutting and opening the portion of each of the sealed ridges of the formed film by using a cutting blade. Furthermore, the d) may include piercing and cutting the portion of each of the sealed ridges of the formed film by using a needle.

Furthermore, lower films, upper films, and formed films may be attached together in a state in which the lower films and the upper films are alternately stacked on top of each other with the formed films each interposed between the lower films and the upper films, and a check valve may be provided on an upper surface of the first end of each of the lower films and on an upper surface of the first end of each of the upper films.

Furthermore, gas may be filled in the ridges of the formed film.

Herein, the gas may be air or an inert gas.

Alternatively, a liquid may be filled in the ridges of the formed film.

Herein, the liquid may be water.

Furthermore, a light reflection layer may be provided on an upper side of the upper film or on a lower side of the lower film, or the light reflection layer may be provided both on the upper side of the upper film and on the lower side of the lower film.

Alternatively, a cover layer may be provided on an upper side of the upper film or on a lower side of the lower film, or the light reflection layer may be provided both on the upper side of the upper film and on the lower side of the lower film.

Advantageous Effects

As described above, the present invention can greatly reduce logistics costs by minimizing a volume during storage and transportation, while greatly increasing insulation.

BEST MODE

Hereinafter, exemplary embodiments of the present invention will be described in further detail with reference to the accompanying drawings. It will be understood by those of ordinary skill in the art that various changes and modifications may be made therein without departing from the technical idea and scope of the present invention and such changes and modifications belong to the claims of the present invention.

Figure 1:
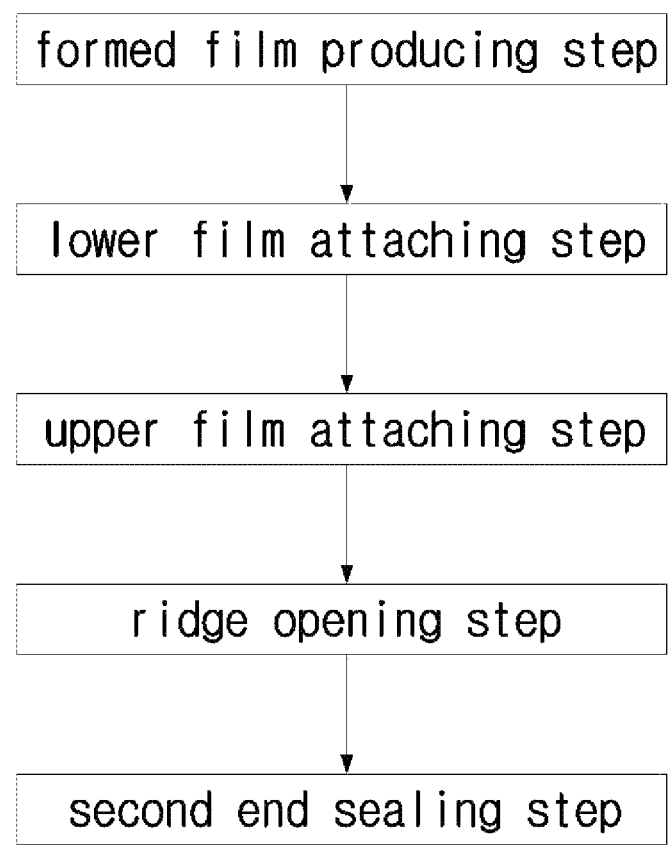
FIG. 1 is a flowchart schematically showing a method for producing a packing sheet with improved insulation and storage properties according to a first embodiment of the present invention.

FIG. 1 is a flowchart schematically showing a method for producing a packing sheet with improved insulation and storage properties according to a first embodiment of the present invention.

As shown in FIG. 1, the method for producing the packing sheet with improved insulation and storage properties largely includes a) a formed film producing step (hereinafter referred to as 'step a)'), b) a lower film attaching step (hereinafter referred to as 'step b)'), c) an upper film attaching step (hereinafter referred to as 'step c)'), d) a ridge opening step (hereinafter referred to as 'step d)'), and e) a second end sealing step (hereinafter referred to as ' step e)').

Figure 2:
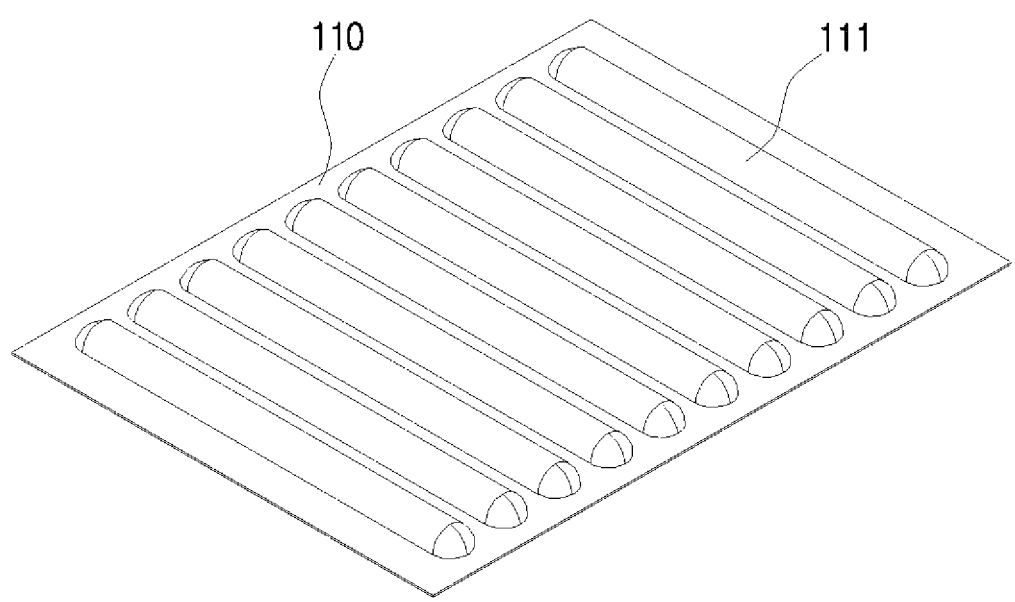
FIG. 2 is a perspective view schematically showing a formed film.

FIG. 2 is a perspective view schematically showing a formed film.

First, as shown in FIG. 2, the step a) is a step of producing the formed film 110 on which a ridge 111 is formed.

Multiple ridges 111 convex upwardly of the formed film 110 are formed at a regular interval in a direction from a front side of the formed film 110 to a rear side thereof.

Figure 3:
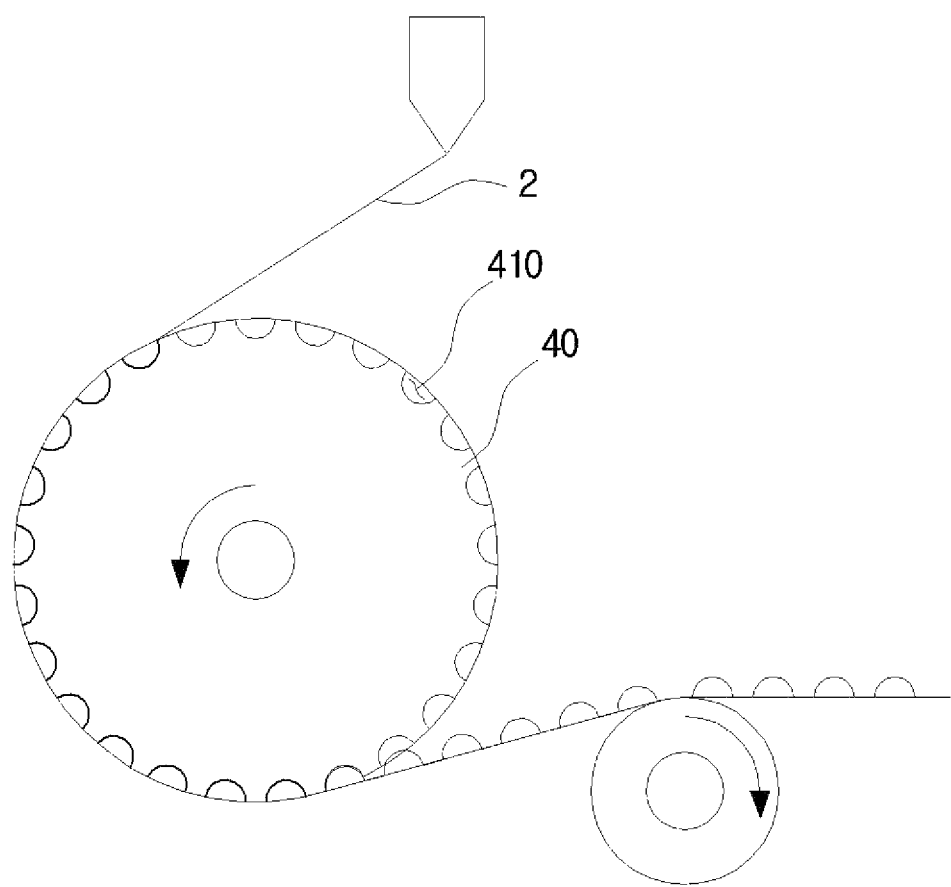
FIG. 3 is a side view schematically showing a process of producing the formed film by using a vacuum forming roller.

FIG. 3 is a side view schematically showing a process of producing the formed film by using a vacuum forming roller.

A method of forming the ridges 111 on the formed film 110 may vary, for example, the vacuum forming roller 40 as shown in FIG. 3 is used.

The vacuum forming roller 40 has forming grooves 410 that are formed in an outer circumferential surface thereof at a regular interval and have a shape corresponding to the ridges 111. The formed film 110 is produced by melt-extruding a thermoplastic synthetic resin 2 onto the vacuum forming roller 40.

Figure 4:
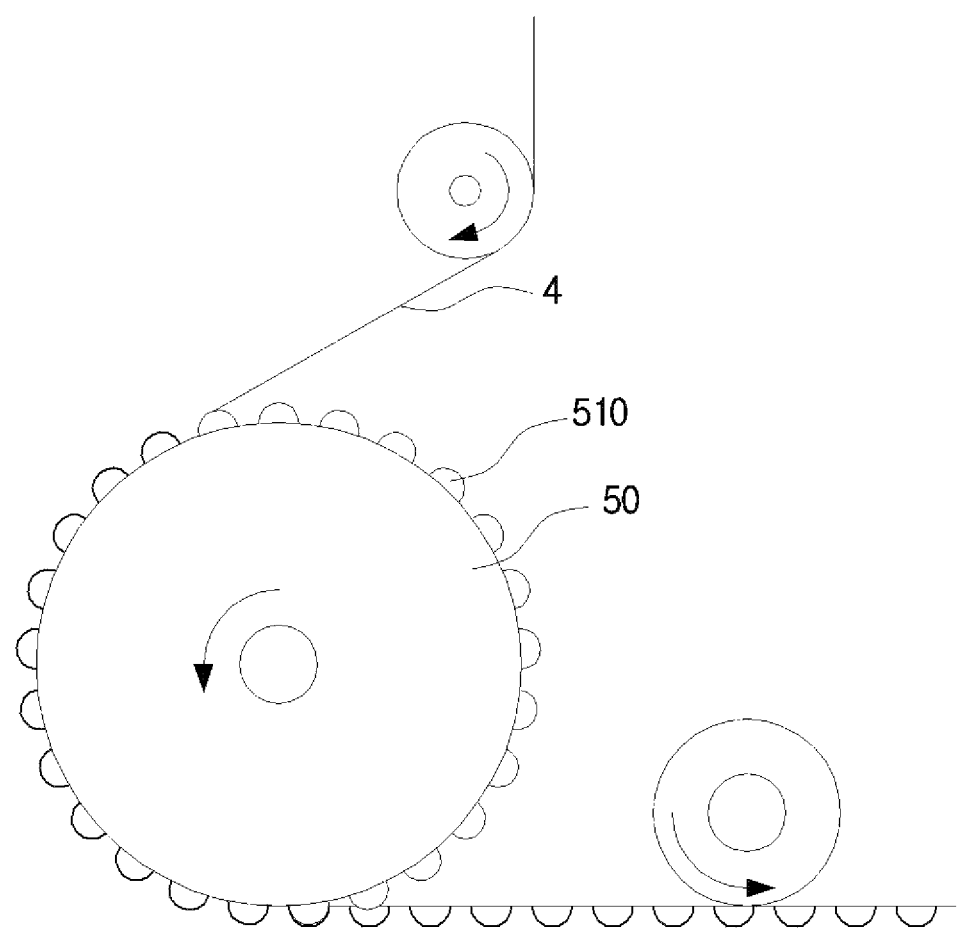
FIG. 4 is a side view schematically showing a process of producing the formed film by using a thermoforming roller.

FIG. 4 is a side view schematically showing a process of producing the formed film by using a thermoforming roller.

As another example, as shown in FIG. 4, the formed film 110 is produced by forming a thermoplastic synthetic resin film 4 by using the thermoforming roller 50 having forming protrusions 510 that protrude from an outer circumferential surface thereof at a regular interval and have a shape corresponding to the ridges 111.

Figure 5:
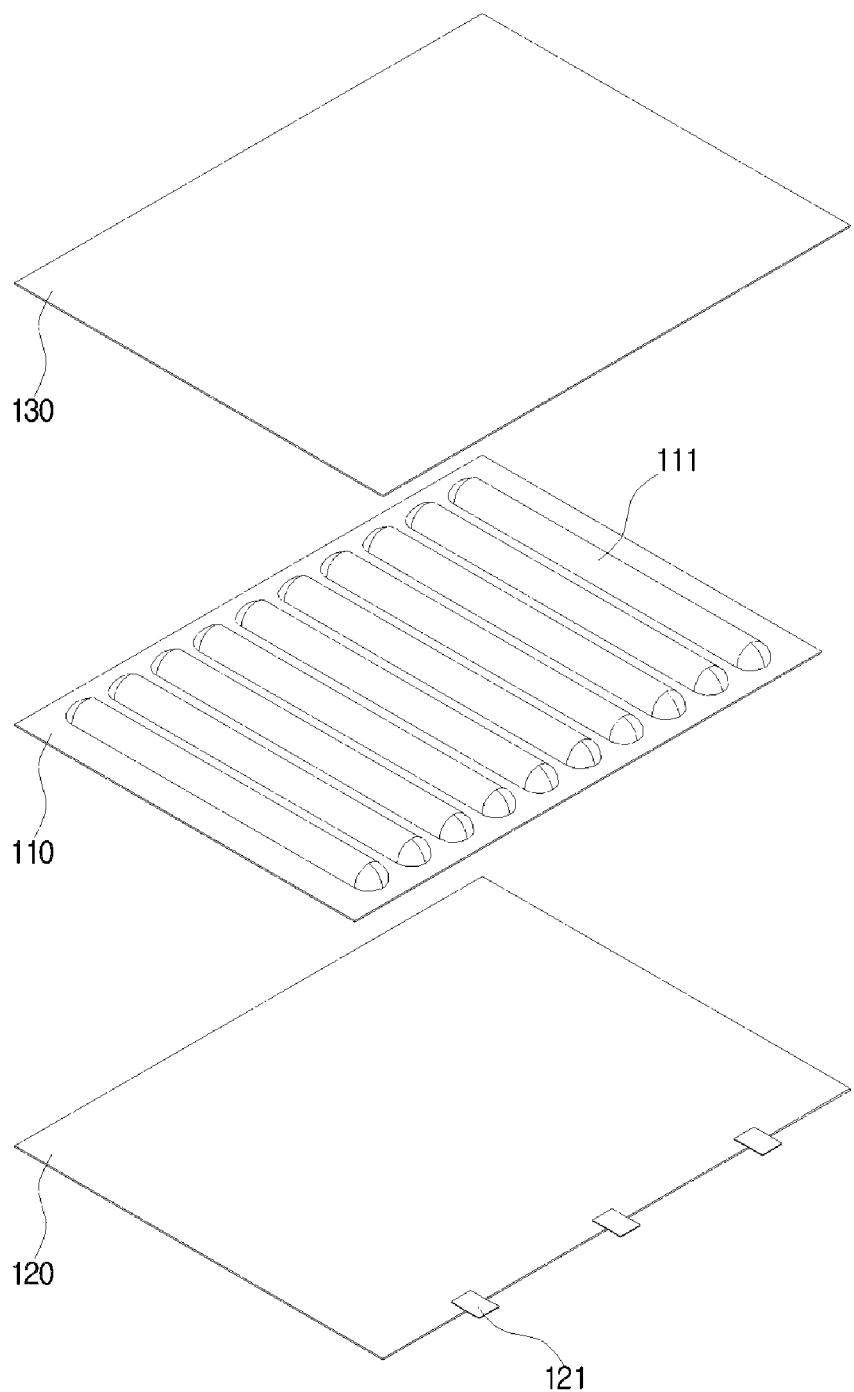
FIG. 5 is an exploded perspective view schematically showing a state in which the formed film, a lower film, and an upper film are separated.
Figure 6:
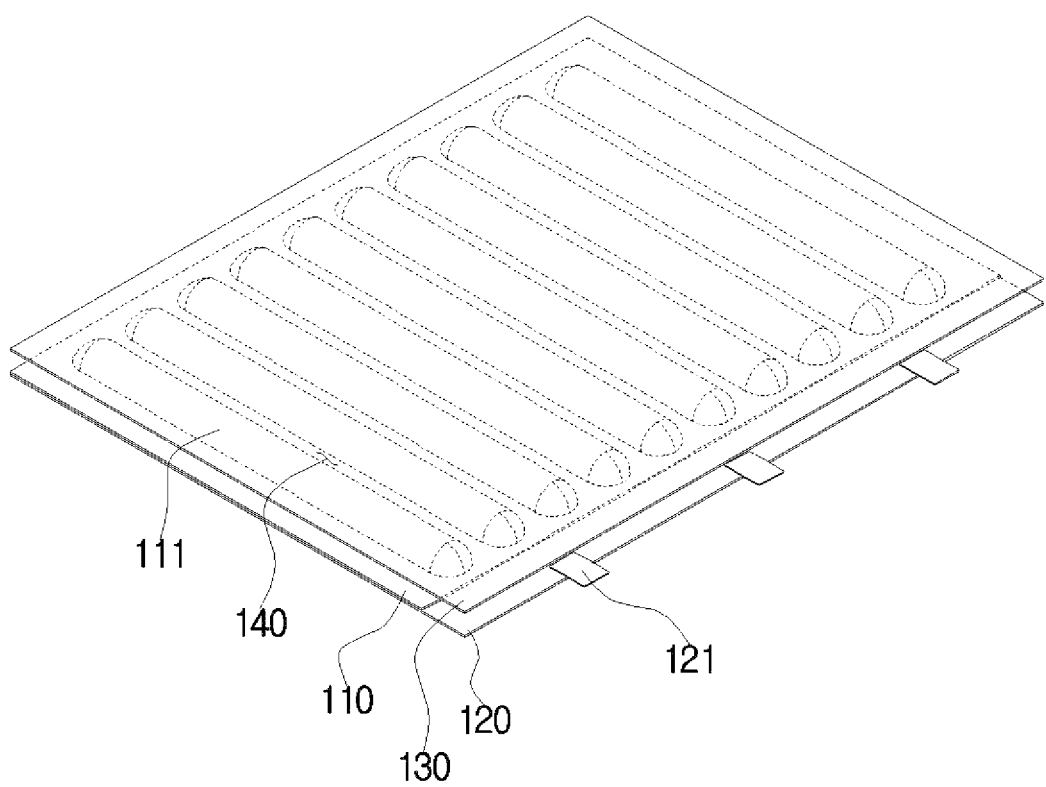
FIG. 6 is an assembled perspective view of FIG. 5.
Figure 7:
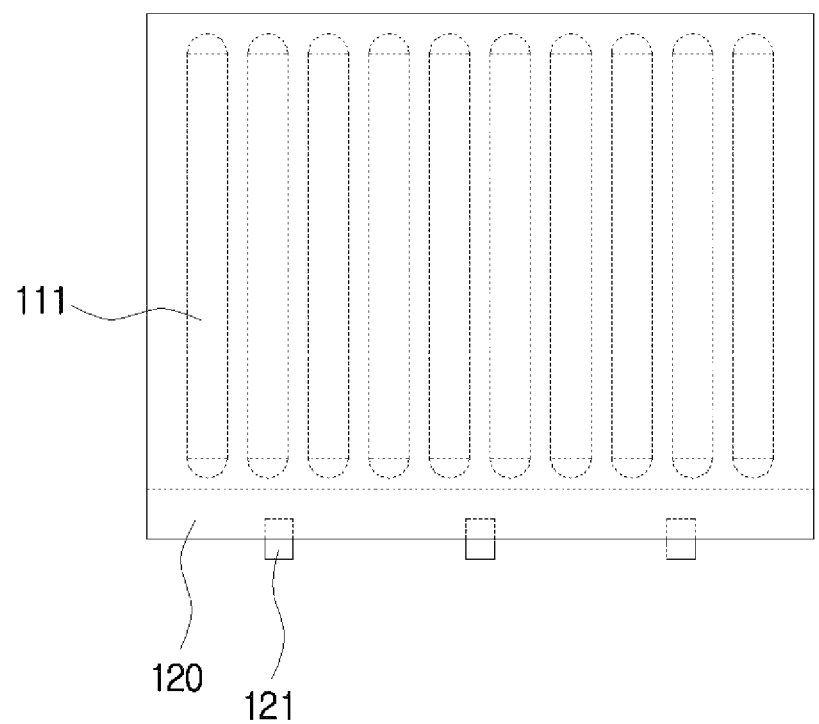
FIG. 7 is a plan view of FIG. 6.

FIG. 5 is an exploded perspective view schematically showing a state in which the formed film, a lower film, and an upper film are separated, FIG. 6 is an assembled perspective view of FIG. 5, and FIG. 7 is a plan view of FIG. 6.

Next, as shown in FIGS. 5 and 6, the step b) is a step of sealing the ridges 111 by attaching the lower film 120 to a lower side of the formed film 110 by various methods such as adhering, welding, or the like.

A first end of the lower film 120 is extended longer than a first end of the formed film 110 in a first side direction of the lower film 120 such that the lower film 120 is longer in left and right length than the formed film 110.

Next, as shown in FIGS. 5 and 6, the step c) is a step of attaching the upper film 130 to the sealed ridges 111 of the formed film 110 by various methods such as adhering or the like.

A first end of the upper film 130 is extended longer than the first end of the formed film 110 in a first side direction of the upper film 130 such that the upper film 130 is longer in left and right length than the formed film 110.

In particular, because the ridges 111 are in a state of being convexly inflated upwardly of the formed film 110 due to a fluid such as air that is initially filled in the ridges 111 in the process of attaching the lower film 120 to the lower side of the formed film 110, it is possible to easily join the upper film 130 to the ridges 111 of the formed film 110.

Next, as shown in FIGS. 5 to 7, a check valve 121 is provided on an upper surface of the first end of the lower film 120 or a lower surface of the first end of the upper film 130.

One check valve 121 may be provided on the upper surface of the first end of the lower film 120 or on the lower surface of the first end of the upper film 130. However, in order to allow air to be injected again into the ridges 111 and a space 140 (see FIG. 6) formed between each of the ridges 111, as shown in FIGS. 5 to 7, it is preferable that at least two multiple check valves 121 are provided at a regular interval on the upper surface of the first end of the lower film 120 or on the lower surface of the first end of the upper film 130.

Figure 8:
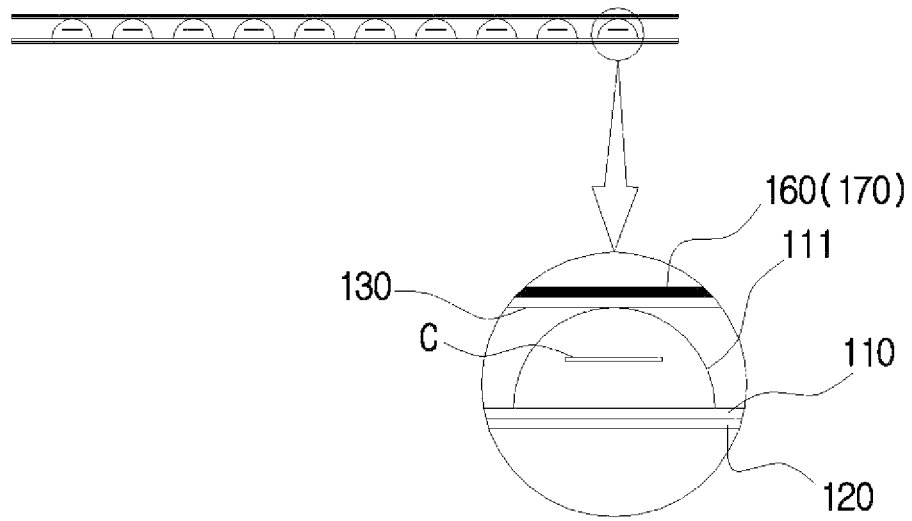
FIG. 8 is a side view schematically showing a state in which a portion of each ridge of the formed film is cut by using a cutting blade and opened.

FIG. 8 is a side view schematically showing a state in which a portion of each ridge of the formed film is cut by using a cutting blade and opened.

Next, the step d) is a step of opening the portion of each of the sealed the ridges 111 of the formed film 110 to remove the fluid such as air in the ridges 111 to outside of the ridges 111.

In the step d), the portion of each of the ridges 111 is opened by various methods. For example, a portion of each of the sealed ridges 111 of the formed film 110, for example, a side portion of each of the ridges 111 is subjected to cutting C horizontally with the cutting blade as shown in FIG. 8.

Figure 9:
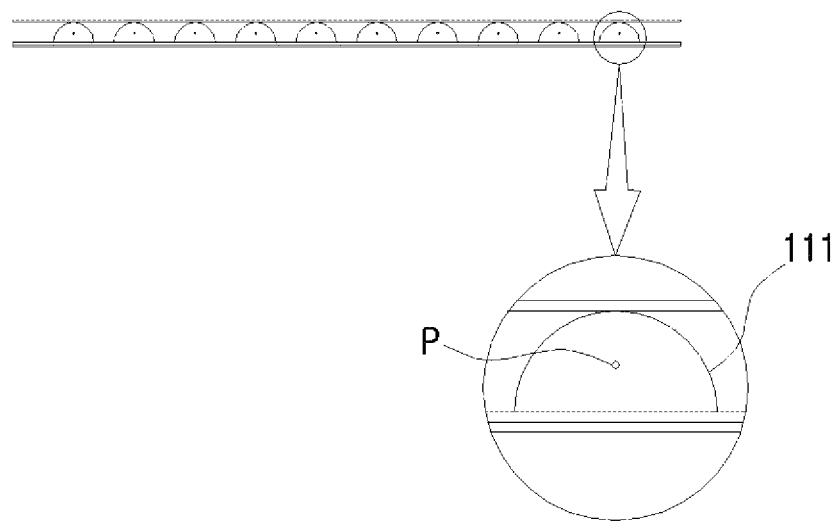
FIG. 9 is a side view schematically showing a state in which the portion of each ridge is pierced by using a needle and opened.

FIG. 9 is a side view schematically showing a state in which the portion of each ridge is pierced by using a needle and opened.

As another example, in the step d), the portion of each of the ridges 111, for example, the side portion of each of the ridges 111 is subjected to piercing P with the needle as shown in FIG. 9.

Figure 10:
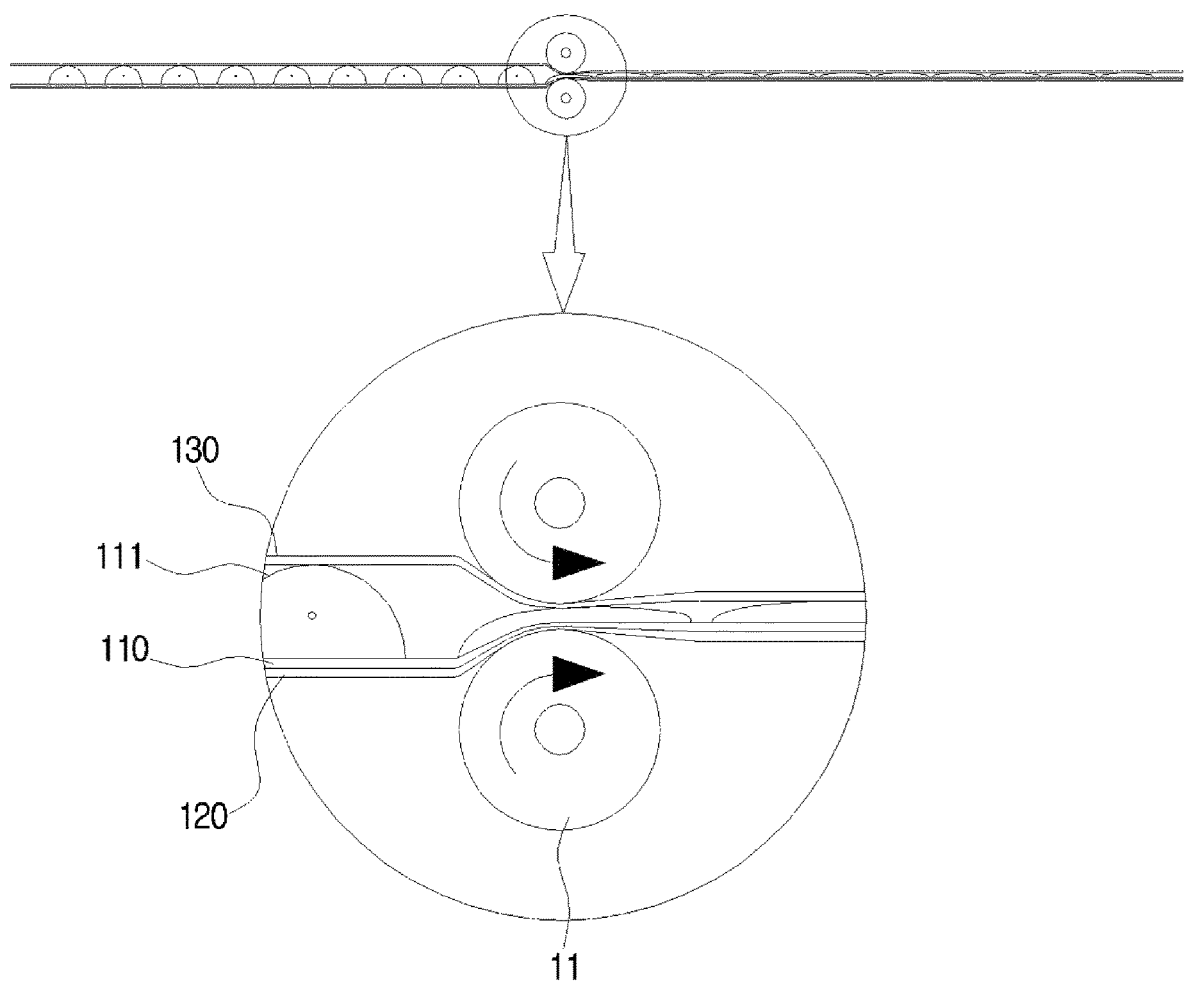
FIG. 10 is a side view schematically showing a process of removing air from the ridges of the formed film.

FIG. 10 is a side view schematically showing a process of removing air from the ridges of the formed film.

As shown in FIG. 10, when the formed film 110, the lower film 120 and the upper film 130 are passed between a pair of rotary rollers 11, the fluid such as air in the ridges 111 of the formed film 110 is removed to outside of the ridges 111 while the formed film 110, the lower film 120, and the upper film 130 are compressed.

Figure 11:
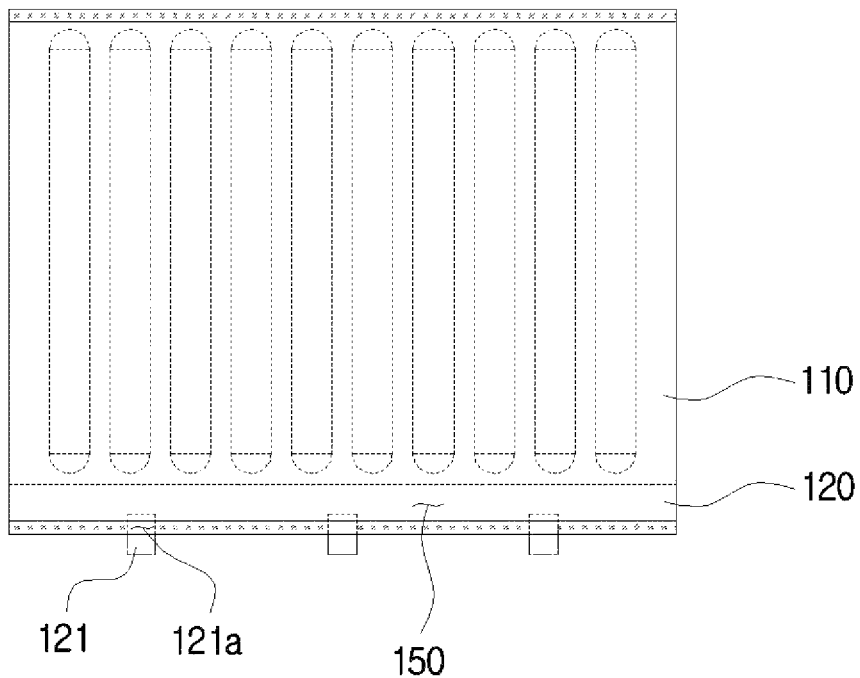
FIG. 11 is a plan view schematically showing a state in which second ends of the lower film, the formed film, and the upper film are sealed, and first ends of the lower film and the upper film are sealed.

FIG. 11 is a plan view schematically showing a state in which seconds ends of the lower film, the formed film, and the upper film are sealed, and first ends of the lower film and the upper film are sealed.

Next, as shown in FIG. 11, the step e) is a step of sealing the second ends of the lower film 120, the formed film 110, and the upper film 130 by various methods such as adhering, welding, or the like after the fluid such as air in the ridges 111 of the formed film 110 having the opened portions is removed.

Next, as shown in FIG. 11, there is further included an injection space forming step (hereinafter, referred to as 'step f)') of forming an injection space 150 by sealing the first end of the lower film 120 and the first end of the upper film 130, except for an injection hole 121a of each of the check valves 121, by various methods such as adhering, welding, or the like.

Figure 12:
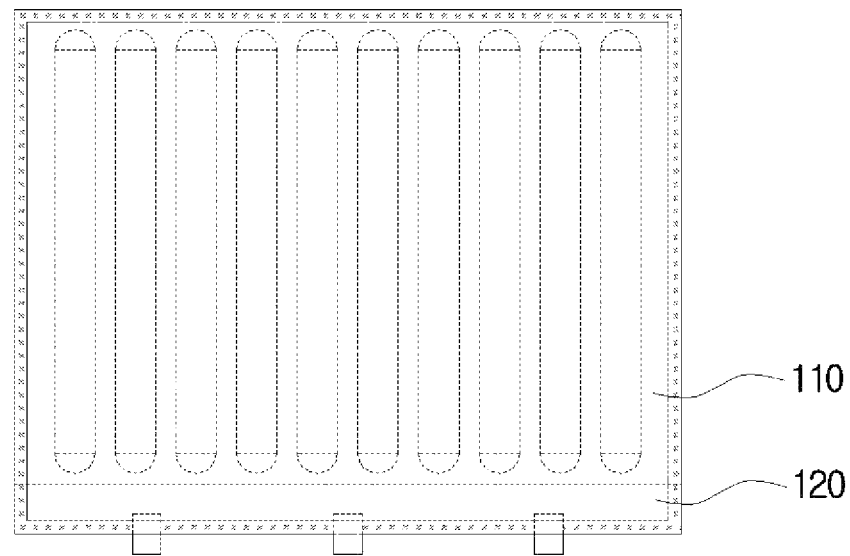
FIG. 12 is a plan view schematically showing a state in which front and rear ends of the lower film, front and rear ends of the formed film, and front and rear ends of the upper film are sealed.

FIG. 12 is a plan view schematically showing a state in which front and rear ends of the lower film, the formed film, and the upper film are sealed.

As shown in FIG. 12, the front ends of the lower film 120, the formed film 110, and the upper film 130 are sealed by various methods such as adhering, welding, or the like. Furthermore, the rear ends of the lower film 120, the formed film 110, and the upper film 130 are sealed by various methods such as adhering, welding, or the like.

Figure 13:
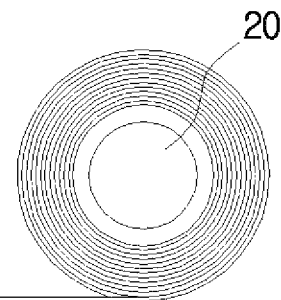
FIG. 13 is a side view schematically showing a state in which the lower film, the formed film, and the upper film state are wound on a winding roller after compression.

FIG. 13 is a side view schematically showing a state in which the lower film, the formed film, and the upper film are wound on a winding roller after compression.

Next, there is further included a winding step (hereinafter referred to as 'step g)') of winding the lower film 120, the formed film 110, and the upper film 130 on an outer surface of the winding roller 20 in a roll type after compression.

On the winding roller 20, the lower film 120, the formed film 110, and the upper film 130 that are in a state in which the second ends thereof are not sealed are wound, or the lower film 120, the formed film 110, and the upper film 130 that are in a state in which the second ends thereof are sealed are wound.

Through the step g), air in the ridges 111 is removed. This makes it possible for the packing sheet to be transported and stored in a state in which the volume is minimized, resulting in a significant reduction in logistics costs.

Figure 14:
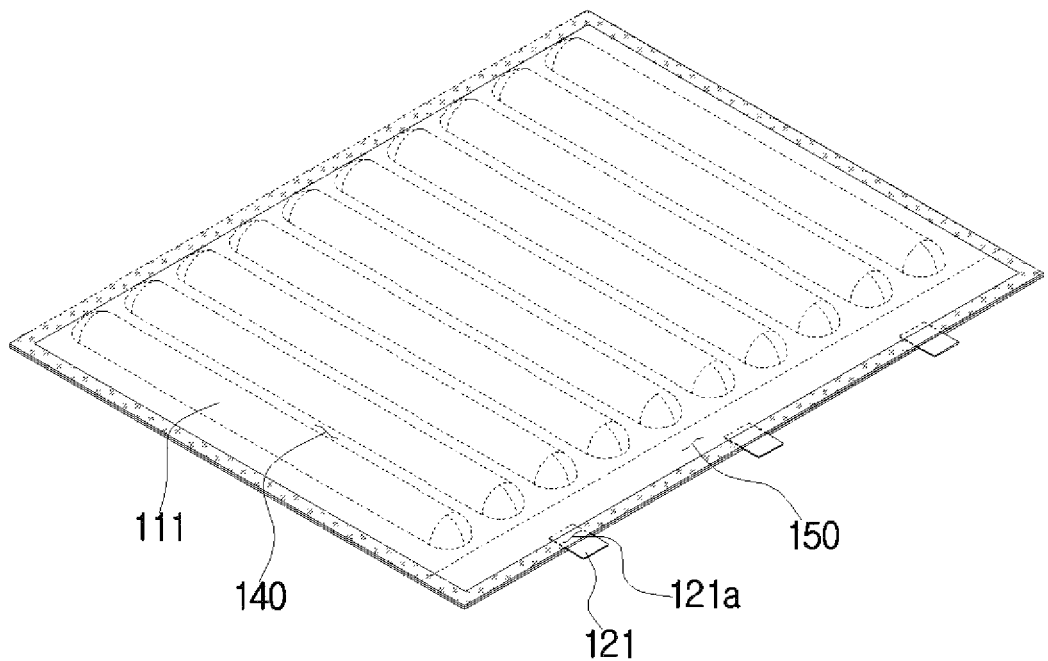
FIG. 14 is a perspective view schematically showing a state in which air is injected again into the ridges and the ridges is inflated.

FIG. 14 is a perspective view schematically showing a state in which air is injected again into the ridges and the ridges are inflated.

Next, an operator injects the fluid such as air into the injection space 150 through the injection holes 121a of the check valves 121 with an injection means such as an injector. As shown in FIG. 14, the fluid such as air injected into the injection space 150 is injected into the ridges 111 having the opened portions and into the spaces 140 formed between the ridges 111.

Figure 15:
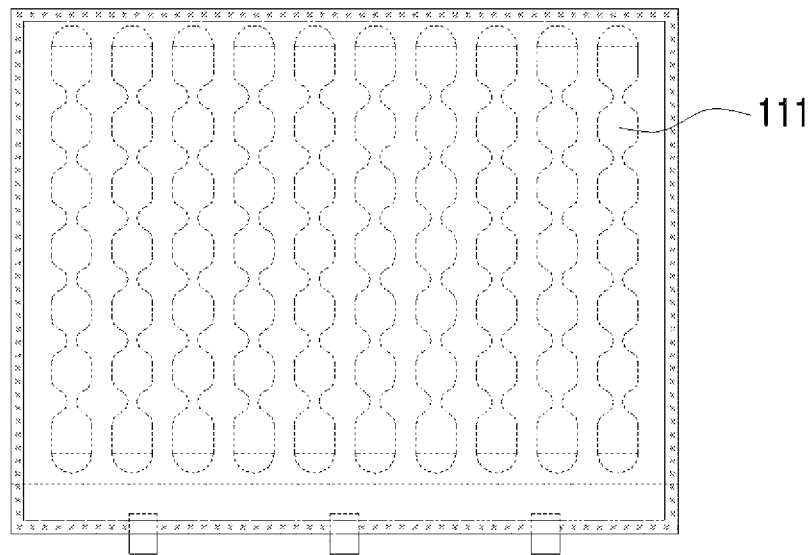
FIGS. 15 and 16 are plan views schematically showing another shape of the ridge.
Figure 16:
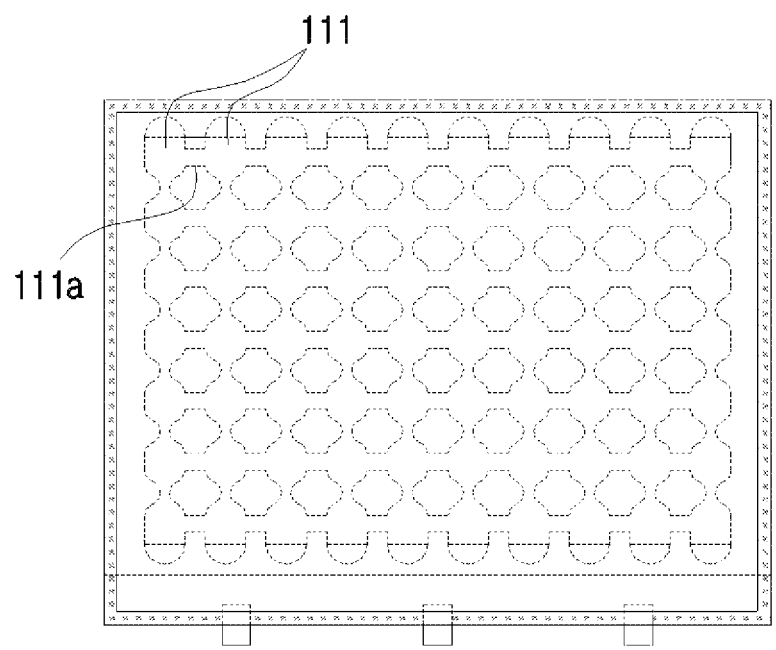

In particular, because the fluid such as air is injected into the spaces 140 formed between the ridges 111, heat exchange due to the spaces 140 is prevented, thus preventing insulation of the packing sheet from being deteriorated with high efficiency FIGS. 15 and 16 are plan views schematically showing another shape of the ridge.

Next, as shown in FIG. 14, the ridges 111 have a "■" shape horizontally extending in a direction from a first side of the formed film 110 toward a second side thereof by a predetermined length, but the present invention is not limited thereto. The ridges may have various shapes, for example, as shown in FIG. 15, multiple ridges are arranged in an hourglass shape so as to communicate with each other in multiple rows.

Furthermore, as shown in FIG. 16, a connecting ridge 111a is provided between a ridge 111 of one row and a ridge 111 of an adjacent row and connects the ridge 111 of one row and the ridge 111 of the adjacent row to each other, such that the connecting ridge communicates with the ridge 111 of one row and the ridge 111 of the adjacent row.

As describe above, the connecting ridge 111a is provided between the ridge 111 of the one row and the ridge 111 of the adjacent row. However, in this case, when any one of the ridges 111 is damaged, a fluid in all the other ridges 111 as well as in the any one of the ridges 111 is liable to leak out of a packing sheet 10. Accordingly, it is preferable that the connecting ridge 111a is not provided.

Figure 17:
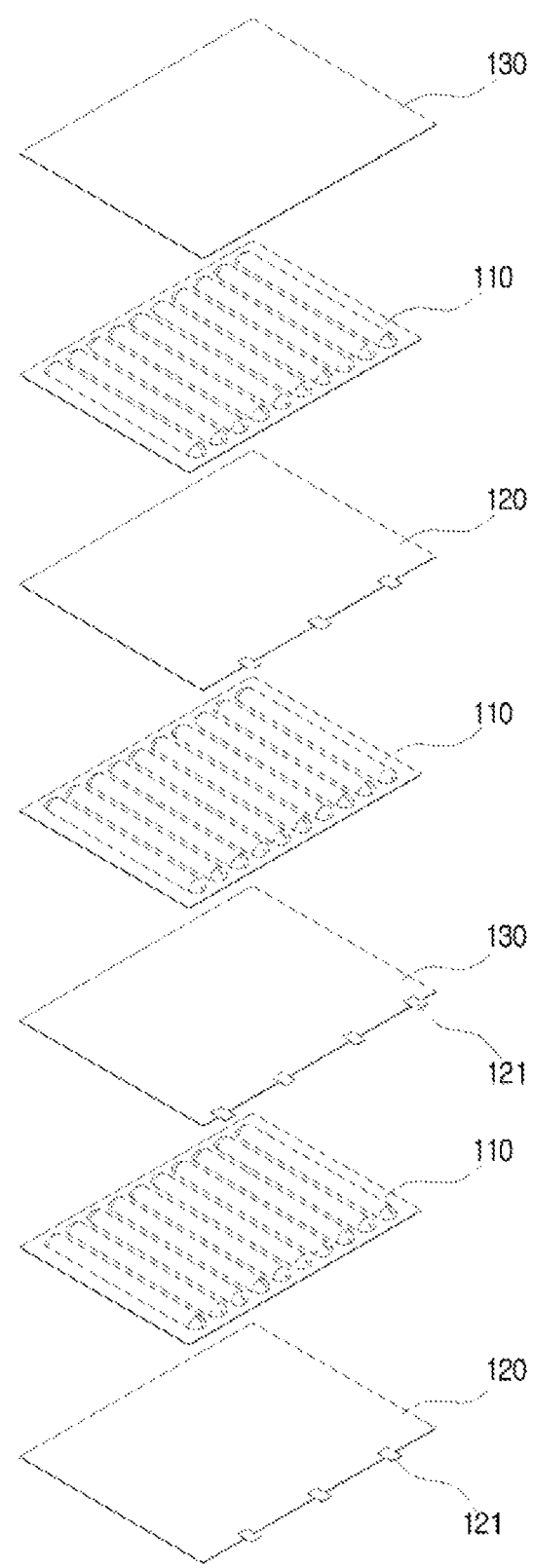
FIG. 17 is an exploded perspective view schematically showing multiple lower films, multiple formed films, and multiple upper films according to a second embodiment of the present invention.
Figure 18:
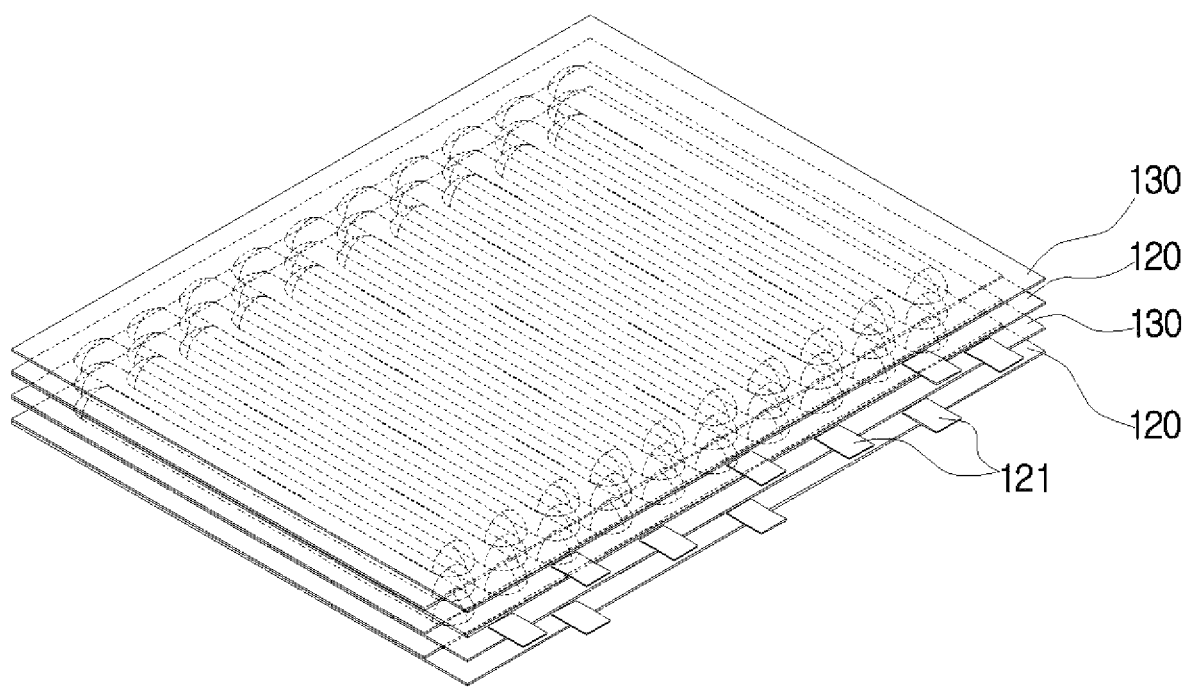
FIG. 18 is an assembled perspective view of FIG. 17.
Figure 19:
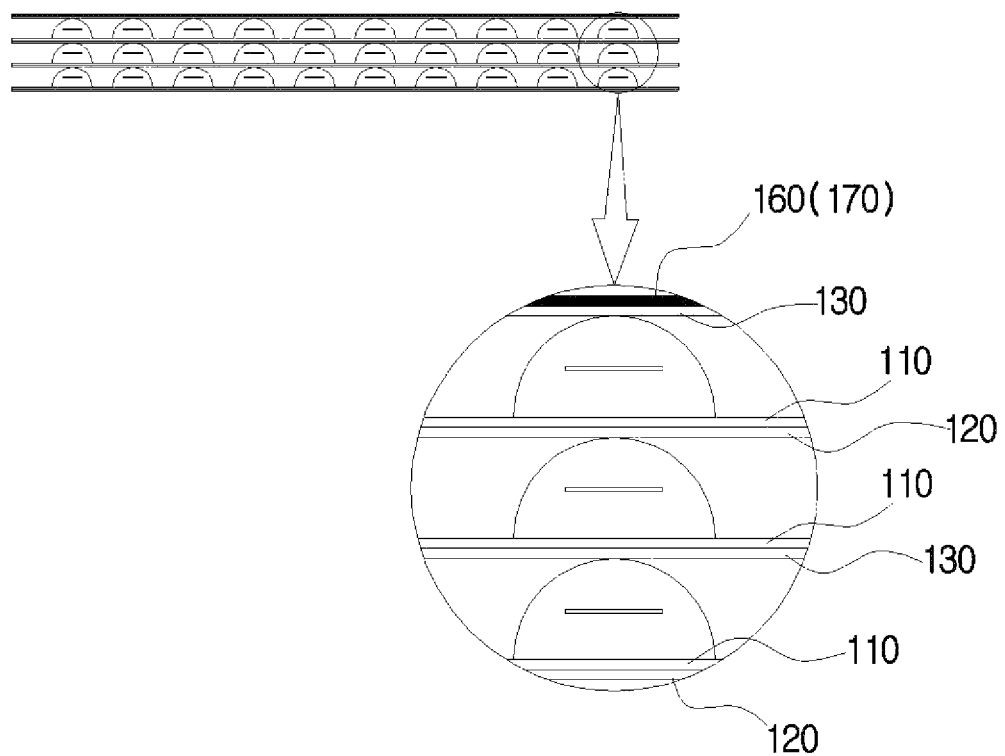
FIG. 19 is an assembled cross-sectional view of FIG. 17.
Figure 20:
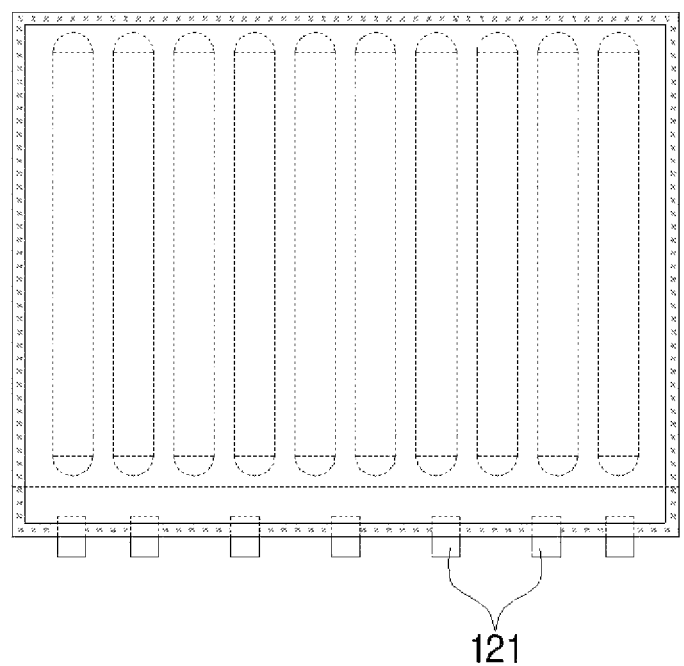
FIG. 20 is an assembled plan view of FIG. 17.

FIG. 17 is an exploded perspective view schematically showing multiple lower films, multiple formed films, and multiple upper films according to a second embodiment of the present invention, FIG. 18 is an assembled perspective view of FIG. 17, FIG. 19 is an assembled cross-sectional view of FIG. 17, and FIG. 20 is an assembled plan view of FIG. 17.

Next, a method for producing a packing sheet with improved insulation and storage properties according to a second embodiment of the present invention is configured in the same manner as that of the first embodiment except that as shown in FIGS. 17 to 20, the lower films 120, the upper films 130, and the formed films 110 are attached together in a state in which the lower films 120 and the upper films 130 are alternately stacked on top of each other with the formed films each interposed between the lower films and the upper films.

Furthermore, the check valves 121 are provided on the upper surface of the first end of each of the lower films 120 and on an upper surface of the first end of each of the upper films 130.

Next, gas such as air is filled in all of the ridges 111 of the formed films 110 as described above, but the present invention is not limited thereto. Various gases may be filled in the ridges 111, such as an inert gas including nitrogen, argon, krypton, helium, neon, xenon, radon, and the like, which are not only excellent in insulation and but also stable and do not easily react.

Alternatively, various liquids such as water may be filled in all of the ridges 111 of the formed films 110.

Alternatively, in the second embodiment, air is injected into all of the ridges 111 of any one of the formed films 110, while the inert gas is filled in all of the ridges 111 of another one of the formed films 110, such that different gases are alternately filled in the ridges 111 of the formed films 110 arranged sequentially from the top to the bottom in one packing sheet 10.

Next, as shown in FIG. 8, a light reflection layer 160 is provided on an upper side of one upper film 130 of the first embodiment or on a lower side of one lower film 120 of the first embodiment. Alternatively, the light reflection layer 160 is provided both on the upper side of the one upper film 130 of the first embodiment and on the lower side of the one lower film 120 of the first embodiment. The light reflection layer is provided by various methods such as adhering, welding, or the like.

Furthermore, as shown in FIG. 19, the light reflection layer 160 is provide on the upper side of the upper film 130 located at the uppermost side of the packing sheet of the second embodiment or on the lower side of the lower film 120 located at the lowermost side of the packing sheet of the second embodiment. Alternatively, the light reflection layer 160 is provided both on the upper side of the upper film 130 located at the uppermost side of the packing sheet of the second embodiment and on the lower side of the lower film 120 located at the lowermost side of the packing sheet of the second embodiment. The light reflection layer is provided by various methods such as adhering, welding, or the like.

The light reflection layer 160 is provided for reflecting light radiated on the packing sheet, thus minimizing generation of heat at a high temperature on the surface of the light reflection layer 160 of the packing sheet 10 and may be made of various materials such as an aluminum foil.

Alternatively, in order to further improve insulation efficiency of the packing sheet 10, instead of the light reflection layer 160, a cover layer 170 composed of any one of a paper layer, a non-woven layer, and a woven layer is provided by various methods such as adhering, welding, or the like.

INDUSTRIAL APPLICABILITY

The present invention can greatly reduce logistics costs by minimizing a volume during storage and transportation, while greatly increasing insulation.

The invention claimed is:

1. A method for producing a packing sheet with improved insulation and storage properties, the method comprising:
   a) producing a formed film on which convex ridges are formed at a regular interval in a direction from a front side to a rear side thereof;
   b) sealing the ridges by attaching a lower film to a lower side of the formed film, the lower film being configured such that a first end thereof is extended in a first side direction thereof longer than a first end of the formed film;
   c) attaching an upper film onto the sealed ridges of the formed film, the upper film being configured such that a first end thereof is extended in a first side direction thereof longer than the first end of the formed film;
   d) opening a portion of each of the sealed ridges of the formed film
   e) allowing the formed film, the lower film, and the upper film to pass between a pair of rotary rollers so as to remove a fluid in the ridges having the opened portions while compressing the formed film, the lower film, and the upper film; and
   f) winding on an outer surface of a winding roller the lower film, the formed film, and the upper film that are in a state in which second ends thereof are sealed, or the lower film, the formed film, and the upper film that are in a state in which the second ends thereof are not sealed.

2. The method of claim 1, wherein a check valve is provided on an upper surface of the first end of the lower film or on a lower surface of the first end of the upper film.

3. The method of claim 2, wherein the check valve comprises multiple check valves that are provided at a regular interval on the upper surface of the first end of the lower film or on the lower surface of the first end of the upper film.

4. The method of claim 2, further comprising:
   forming an injection space by sealing the first end of the lower film and the first end of the upper film, except for an injection hole of the check valve.

5. The method of claim 1, wherein the formed film is produced by melt-extruding a thermoplastic synthetic resin onto a vacuum forming roller having forming grooves that are formed in an outer circumferential surface thereof at a regular interval and have a shape corresponding to the ridges.

6. The method of claim 1, wherein the formed film is produced by forming a thermoplastic synthetic resin film by using a thermoforming roller having forming protrusions that are formed at a regular interval and have a shape corresponding to the ridges.

7. The method of claim 1, wherein the step d) includes:
cutting and opening the portion of each of the sealed ridges of the formed film by using a cutting blade.

8. The method of claim 1, wherein the step d) includes:
piercing and opening the portion of each of the sealed ridges of the formed film by using a needle.

9. The method of claim 1, wherein a light reflection layer is provided on an upper side of the upper film or on a lower side of the lower film, or the light reflection layer is provided both on the upper side of the upper film and on the lower side of the lower film.

10. The method of claim 1, wherein a cover layer is provided on an upper side of the upper film or on a lower side of the lower film, or the light reflection layer is provided both on the upper side of the upper film and on the lower side of the lower film.

\* \* \* \* \*